United States Patent [19]
Robb

[11] Patent Number: 5,619,182
[45] Date of Patent: Apr. 8, 1997

[54] CONFIGURABLE COLOR SELECTION CIRCUIT FOR CHOOSING COLORS OF MULTI-COLORED LEDS IN TOYS AND SECONDARY AUTOMOTIVE FLASHER/BRAKE INDICATORS

[76] Inventor: Charles L. R. Robb, 976 S. 900 East, Salt Lake City, Utah 84105

[21] Appl. No.: 588,323

[22] Filed: Jan. 18, 1996

[51] Int. Cl.$^6$ .................................................. B60Q 1/34
[52] U.S. Cl. ........................ 340/479; 340/475; 340/465; 340/815.45; 340/815.67; 362/231; 362/61; 362/800; 362/808
[58] Field of Search .................................. 340/468, 471, 340/475, 479, 463, 465, 815.45, 815.65, 815.67; 362/61, 800, 231, 293, 808, 124

[56] References Cited

U.S. PATENT DOCUMENTS

| | | | |
|---|---|---|---|
| 3,733,743 | 5/1973 | Kossoff | 46/228 |
| 4,550,281 | 10/1985 | Hirata | 318/723 |
| 4,585,424 | 4/1986 | DeMars | 446/295 |
| 4,756,017 | 7/1988 | Bush | 379/23 |
| 4,780,621 | 10/1988 | Bartleucci et al. | 307/11 |
| 4,903,530 | 2/1990 | Hull | 73/304 |
| 5,066,929 | 11/1991 | Frantz | 331/57 |
| 5,194,854 | 3/1993 | Havel | 340/815.1 |
| 5,247,280 | 9/1993 | Incorvaia | 340/458 |
| 5,264,827 | 11/1993 | Giovanni | 340/477 |
| 5,298,882 | 3/1994 | Tsai | 340/468 |
| 5,453,731 | 9/1995 | Beyer | 340/438 |
| 5,543,776 | 8/1996 | L'Esperance et al. | 340/426 |

*Primary Examiner*—Jeffery Hofsass
*Assistant Examiner*—Daniel J. Wu
*Attorney, Agent, or Firm*—Workman, Nydegger & Seeley

[57] ABSTRACT

A multi-colored LED biasing circuit that allows users to selectively choose the colors for a given state or condition. A user will assign by use of switches which color of a multi-colored LED will light on the presence of an electronic signal representing a state or condition in need of a visual output. One embodiment for a tri-colored LED will allow a user to select a base color for when no signal is present, the base color selected between a first color, and a second color and a secondary color for when a signal is present, the secondary color selected between the opposite of the base color (first or second color) and a third color. The invention is also embodied as a secondary flasher/brake indicator for automobiles that can be embodied in a number of different forms such as a stick shift knob having indication areas, a figurine having suction cup mounting means or hanging means for placement within the vehicle, or an integrated rear view mirror having indication areas lit by multi-colored LEDs. Again, the user will select a base color for the indication areas that corresponds to one color in a tri-colored LED and a secondary color for when the flasher or brake is operated. The base color may be selected between a first and second color while the secondary color may be selected from the non-chosen base color and a third color.

14 Claims, 5 Drawing Sheets

CONFIGURABLE COLOR SELECTION CIRCUIT FOR CHOOSING COLORS OF MULTI-COLORED LEDS IN TOYS AND SECONDARY AUTOMOTIVE FLASHER/BRAKE INDICATORS

BACKGROUND OF THE INVENTION

1. The Field of the Invention

The field of this invention is multi-colored LED biasing circuitry providing user selectability of colors in multi-colored LEDs. More particularly, this invention deals with toy figurines using multi-colored LEDs for eyes and automobile accessories for providing secondary flasher/brake indicators in the automotive arts that use multi-colored LEDs as a means for indicating flasher/brake operation.

2. Present State of the Art

Although multi-colored LEDs, particularly bi-colored and tri-colored LEDs, are commonly used in a variety of different applications, the user rarely selects the particular color to be used in representing a designated state or condition. In other words, the designer of a particular application, whether it be a computer, a game, or a toy, will assign and incorporate meaning to the different colors the multi-colored LED will emit to represent an arbitrary meaning.

For example, a tri-color LED in a notebook computer having a rechargeable battery may be assigned the color green to represent the state of the battery when fully charged, red to represent the state of the battery when it is dangerously low, and amber to represent the state where the battery is in the process of being charged. The user would be unable to alter or change the different colors to match the different states according to taste. In other words, a user could not switch the color red to represent the state of the battery while being charged from the state of the battery being dangerously low.

It is desirable to allow a user to select the colors of a multi-colored LED representing state, condition, or the presence of a desired electronic signal in a number of situations. This could be done to match the decor of a given environment with the color of the LED in use to provide aesthetically pleasing color combinations or colors could be selected to minimize confusion with other LED indicators.

Present circuitry typically utilizes all available colors of a multi-colored LED by assigning each individual color to represent a particular state, condition, or presence of an electrical signal. Besides lacking the ability to switch colors between the different states, there are also no excess colors available. Excess available colors could be used for assignment to a particular state, condition or presence of an electrical signal to allow user selectability between available colors.

In the area of toys, LEDs and other lighting means are sometimes used for eyes in dolls, toy animals, and other figurines. While such figurines have been known to have eyes that light up, open and close, or blink, none of these variations substantially change the nature of the eye itself. By selectively changing the fundamental characteristic of an eye in a figurine, a different state may be represented in the figurine to enhance play or provide greater flexibility for decorative purposes.

Furthermore, no dolls, toy animals, or other figurines are known that have eyes that will completely change color. Completely changing the color of an eye found in the figurine is an example of a fundamental change of a characteristic of the eye that signifies a change of state for the figurine. The use of a multi-color LED as an eye in a figurine gives many options for changing the eye color without resorting to complex mechanical means for accomplishing such a purpose.

In the area of automotive flashers and brake indicators, there exist a number of different circuits and apparatuses that assist in reminding a person of flashers that have inadvertently been left in use. Many times, such circuits utilize alarms, different flash rates, and other means to indicate that a flasher has been left on for an inordinate amount of time. Other circuits will detect a burned out flasher lamp or brake lamp and provide means to indicate to the operator of an automobile that such a lamp is in need of replacement.

It would be desirable to have secondary flasher and brake operation indicator accessories that are decorative in nature as well as functional. In this way, an automobile operator may have a subtle and pleasant reminder of the status of brake and turn signal operations. A decorative secondary flasher/brake indicator may be placed in a variety of locations within a vehicle cockpit. The colors of the indicator light may represent the brake or flasher operation and the nonuse state where no brake or flasher operation is occurring. Also, the use of multi-colored LEDs as indication means would allow for decorative secondary flasher/brake indicators to be made in a much smaller form factor. Such miniaturization provides less obtrusiveness into the overall vehicle environment while still providing the secondary indication functionality desired by the automobile operator. Furthermore, inexpensive LEDs require less support structure in the way of filters, mounting brackets, etc. thereby providing a lower cost alternative to regular bulbs.

SUMMARY AND OBJECTS OF THE INVENTION

It is an object of this invention to allow a user to assign colors in a multi-colored LED to a given electronic signal representing a state or condition in order to provide that signal with a visual output of the desired color.

It is also an object of this invention to provide a circuit that allows user-selectability of colors in a multi-colored LED.

It is another object of this invention to allow users of toy figurines to selectively change the eye color of the figurine in order to represent different states or conditions of the toy for enhanced play and greater decorative appeal.

It is yet another object to provide a toy figurine having multi-colored LEDs for eyes wherein a user can select the color of the eyes.

It is a further object of this invention to provide a decorative automotive secondary flasher/brake indicator that may be conveniently placed at a number of locations, within the cockpit of an automobile or other motor vehicle.

It is yet a further object of this invention to allow user selectability of colors representing the absence of flasher/brake activity and the presence of brake/flasher activity in a decorative secondary flasher/brake indicator.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a configurable color selection circuit for choosing colors of multi-colored LEDs in toys and secondary automotive flasher/brake indicators is provided.

Multi-colored LEDs that are the subject of this invention are typically bi-colored or tri-colored though the principles disclosed herein would work with any number of colors found in a single LED. Circuits of the present invention allow the user to selectively determine which colors of a multi-colored LED correspond to the various signals or states that require the visual output of the LED. In some instances, there may be fewer signals or states requiring visual output than the actual number of colors available for assignment to these states or signals. For example, a tri-color LED used to represent only two states will only use two of the three colors available.

The circuit as implemented in a preferred embodiment for use with tri-color LEDs, provides two user selectable colors. One color represents the absence of a signal and the other represents the presence of a signal. The signal can, in turn, represent any state or condition that the designer of a given application desires.

This circuit allows powerful benefits to users of applications incorporating the circuit by allowing user-selectability in assigning colors to particular actions or signals. Besides the obvious aesthetic value of choosing the colors exhibited as part of a larger environment, confusion and ambiguity may be reduced by allowing different colors to mean different things on a complicated or critical piece of equipment according to user preference or desire.

Two color selection switches allow the user to select colors, while a third switch can be used to power the entire system. The first switch, or base color switch, determines whether a first color or a second color is used for the base color of the circuit when the particular signal is not present. The second switch, or secondary color switch, determines whether the opposite color chosen by the base color switch (previously non-chosen first or second color) or a third color is used for the secondary color when the signal is present. The switches cooperate and interact in the circuit so as to properly bias the tri-colored LED to achieve the desired colors according to the previous explanation.

A typical tri-color LED will have two conventional diodes oriented in a single package that are readily operated through a three lead package. The third color is achieved by combining or altering the current through the diode, so that the two separate diodes tend to illuminate simultaneously creating the third color. For example, one known tri-color LED has red and green as its main diode colors and a third color, amber, is created by the current driving both red and green colors simultaneously. Therefore, red or green is chosen as a base color through the above-mentioned base color switch and the secondary color is chosen from either the opposite of the base color (previously non-chosen red or green color) or the third color, amber. This is best illustrated in Table 1 below:

TABLE 1

| Presence of Signal | Base Switch Color Selection | Secondary Switch Color Selection | The LED Will Light |
|---|---|---|---|
| No Signal Present | R | Opposite of Base (G) | R |
| No Signal Present | R | A | R |
| No Signal Present | G | Opposite of Base (R) | G |
| No Signal Present | G | A | G |
| Signal Present | R | Opposite of Base (G) | G |
| Signal Present | R | A | A |
| Signal Present | G | Opposite of Base (R) | R |
| Signal Present | G | A | A |

R = Red, G = Green, A = Amber

This circuit provides a multitude of useful applications, including use in a automotive secondary flasher/brake indicator. An automotive secondary flasher/brake indicator utilizing tri-colored LEDs to provide a visual representation of flasher or brake operation can be advantageously made using multi-colored LEDs.

Since, multi-colored LEDs can be made to illuminate two or more completely different colors, their use eliminates the need for colored filters, multiple bulbs, or complex structure that would be necessary for a conventional bulb arrangement. Furthermore, multi-colored LEDs can be used in a much smaller and less obtrusive manner than would a normal bulb assembly.

To operate such a secondary flasher/brake indicator, the user would operate three switches: an on-off switch to power the device, a base color switch to indicate a desired color while no flasher or brake is operated, and a secondary color switch to indicate a desired color for when a brake or flasher is operated.

The decorative secondary flasher/brake indicator can be incorporated into a wide variety of decorative and useful forms. One embodiment utilizes a figurine that may be attached with a suction cup or hung from a rear view mirror by a cord or other hanging means. Another embodiment is integrated directly into the rearview mirror of the automobile providing the LEDs at a convenient location when a vehicle operator glances at the mirror. Yet another embodiment can be incorporated into a stick shift handle.

All embodiments of a decorative secondary flasher/brake indicator will provide a secondary indication of flasher status to alert a driver should a flasher be inadvertently left operative long after a turn is made. This happens in a number of situations even when drivers are otherwise conscientious. For example, using a flasher to signal a lane change on a freeway does not actuate the automatic mechanism for stopping the flasher at the completion of the change. The same is true when a driver makes gentle or gradual turns.

The stick shift knob embodiment of the decorative secondary flasher/brake indicator is small and unobtrusive yet provides the desired secondary indication. The LEDs may be placed within the stick shift knob close to the area to be illuminated or they may be placed at a different location with the light being carried to desired indication areas by way of fiber optics or other optical conduits.

The embodiments basically differ in the overall design of the ornamental housings that contain the indication area to be illuminated by the tri-color LEDs and in their location within the vehicular cockpit. While the integrated rearview mirror embodiment is optimally and preferably available as a factory accessory from the automotive manufacture, the suction cup mounted or hanging figurine would be an ideal aftermarket auto accessory for a car hobbyist.

The above-mentioned circuit is also advantageously used in toys or other figurines having multi-colored LEDs used for eyes. Such a figurine, that has a power source, circuitry, and three switches can be implemented to make the figurine more decorative or for enhanced play by children of all ages. The first switch would power on the circuit and cause the eyes to illuminate, while the second and third switches could be selectively actuated to provide the three different colors of a tri-color LED according to the functioning of the above-described circuit. For example, during play, a first color could represent the normal status of the figurine or creature, while a second color could represent super-human powers or other added ability and change of state, while the third color could represent laser eye action for destroying objects or undesirable opponents. Clearly, unlimited possibilities exist and the fertile imagination of a child would undoubtedly determine a plethora of differing states or conditions assigned to the various eye colors.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
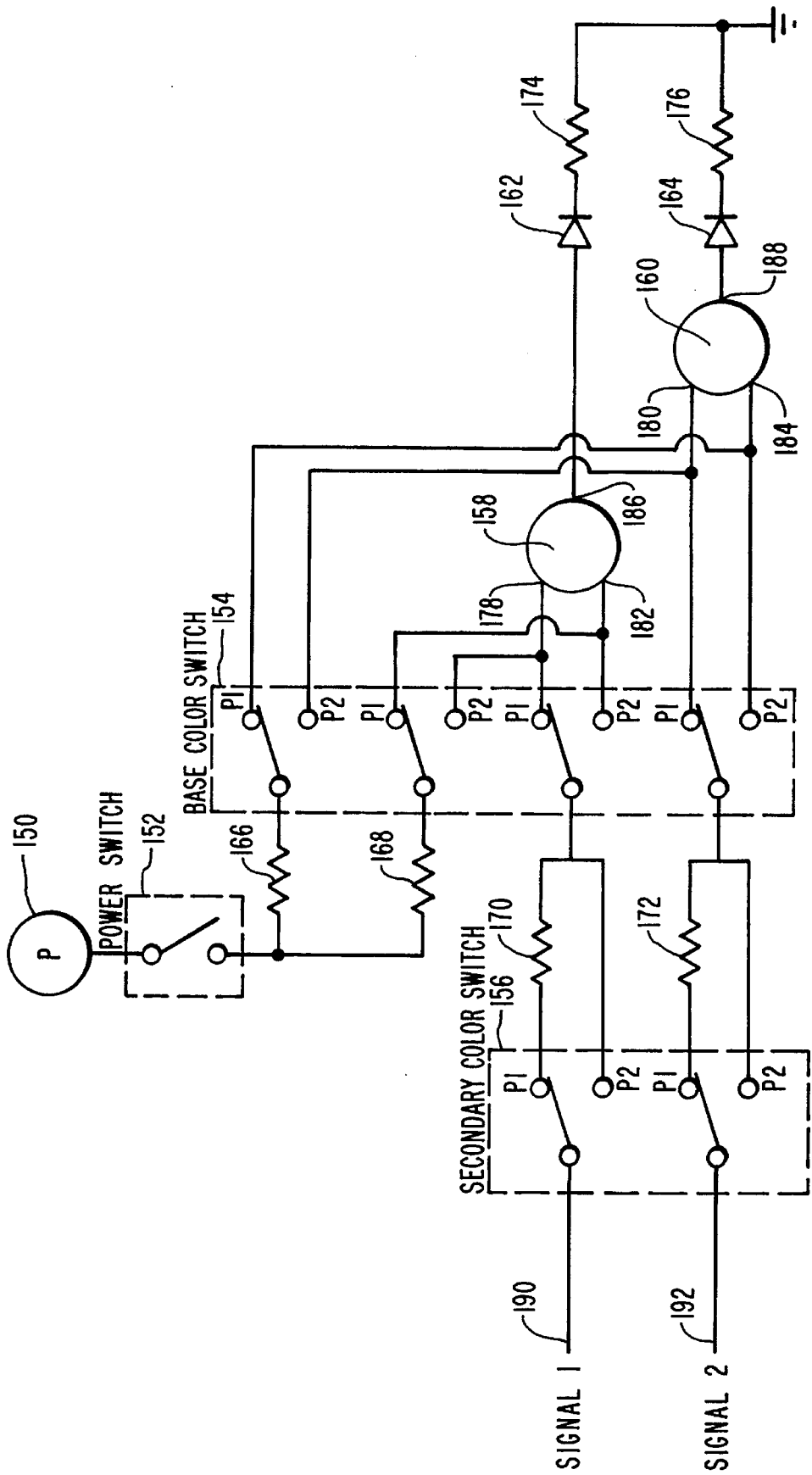
FIG. 1 is a circuit diagram showing an embodiment of the invention for two tri-colored LEDs wherein a base switch is used to choose a base color when no signal is present and a secondary switch is used to select a secondary color when a signal is present.

FIG. 1 is a diagram of a circuit according to the present invention wherein two tri-color LEDs 158 and 160 may be biased by use of base color switch 154 and secondary color switch 156 to exhibit a base color when no signal is present and a secondary color when a signal is present. There are individual signals present on signal leads 190 and 192 that correspond to their respective tri-color LEDs. The tri-color LEDs 158 and 160 of this circuit are red and green primary LEDs housed in one package. A third color, amber, is achieved by simultaneously lighting the red and green LEDs. As such, each tri-color LED 158 and 160 has a respective green anode 178 or 180, a red anode 182 or 184, and a common cathode 186 or 188.

The common cathodes 186 and 188 of the tri-color LEDs 158 and 160 respectively, are connected in series with respective back feeding diodes 162 and 164 followed by current limiting resistors 174 and 176 before being grounded. Current limiting resistors 174 and 176 are chosen of the appropriate value in order to prevent the tri-color LEDs 158 and 160 from being damaged during operation of the circuit. These values will be chosen according to the specifications dictated by the manufacturer of a tri-color LED and will vary according to such specification. Examples of possible tri-color LEDs that could be used in this circuit include models 4363D1/5, 530581/5, or 5305H3/5 available from Industrial Devices, Inc., 260 Railroad Avenue, Hackinsack, N.J. Intensity resistors 166–172 are used to further moderate the current so as to achieve the desired light intensity on the respective tri-color LED 158 or 160.

Power is made available to the circuit through a power source 150 that may include power directly from an automobile battery, toy battery, or other source of power. Power switch 152 controls whether or not the circuit is powered up. Upon closure of power switch 152, current passes through intensity resistors 166 and 168 before passing through base color switch 154. Base color switch 154 determines the base color of the tri-color LEDs 158 and 160 with the switch in position P1 corresponding to powering the respective red anode 182 and 184 to thereby cause the base color to be "red." Likewise, when base color switch 154 is in position P2 the current is directed to the respective green anode 178 and 184 of tri-color LEDs 158 and 160 to thereby cause a "green" color for base operations.

Electronic Signal 1 and Signal 2 are presented to the circuit at signal leads 190 and 192 respectively. This signal is simply a voltage value that will cause current to pass through signal lead 190 or 192 depending on the presence of the designated signal. The Signal 1 or Signal 2 can represent a state, condition or any other situation requiring visual output that a designer of the circuitry may desire. Secondary color switch 156 determines what color the tri-color LEDs 158 and 160 will emit at the presence of a signal. It should be noted that the base color switch 154 will also direct the signal input to the opposite anode of that selected by the base color switch 154. For example, in position P1 as shown, current is directed towards the respective green anode 182 or 184 to cause the "green" base color operation. Position P1 also directs any current generated by a signal to be focused into the respective red anode 178 and 180 of tri-color LEDs 158 and 160.

The secondary color switch 156 essentially determines the amount of current that will be directed into the "opposite" anode as that selected by base color switch 154 for base color operation. If no signal is present, then no current will be generated and the base color will be emitted. If a signal is present, the secondary color switch 156 will determine the amount of current that will travel through the tri-color LED 158 and 160 through the "opposite" anode. If this current is equal to the current placed through the base color anode, then the third color will emit as a mixture of the two internal diodes of the tri-color LED 158 and 160 or amber. On the other hand, if the current is significantly greater than that which passes through the base anode, then the color "opposite" the base will illuminate.

When the secondary color switch 156 is in position P1, current limiting resistor 170 will create equal current through the two anodes of the respective tri-color LED 158 and 160 to thereby cause the third color to emit. When the secondary color switch 156 is in position P2, then a significantly higher current will pass through the "opposite" anode to cause the opposite color than the base color to be emitted. In this manner, by proper operation of base color switch 154 and secondary color switch 156, a user may select a base color from two primary colors of a tri-color LED, namely red or green in this example. The secondary color switch 156 will determine whether the LED lights the "opposite" of the base color (the other non-chosen primary LED color—red or green) or the third color, amber, will result.

Figure 2:
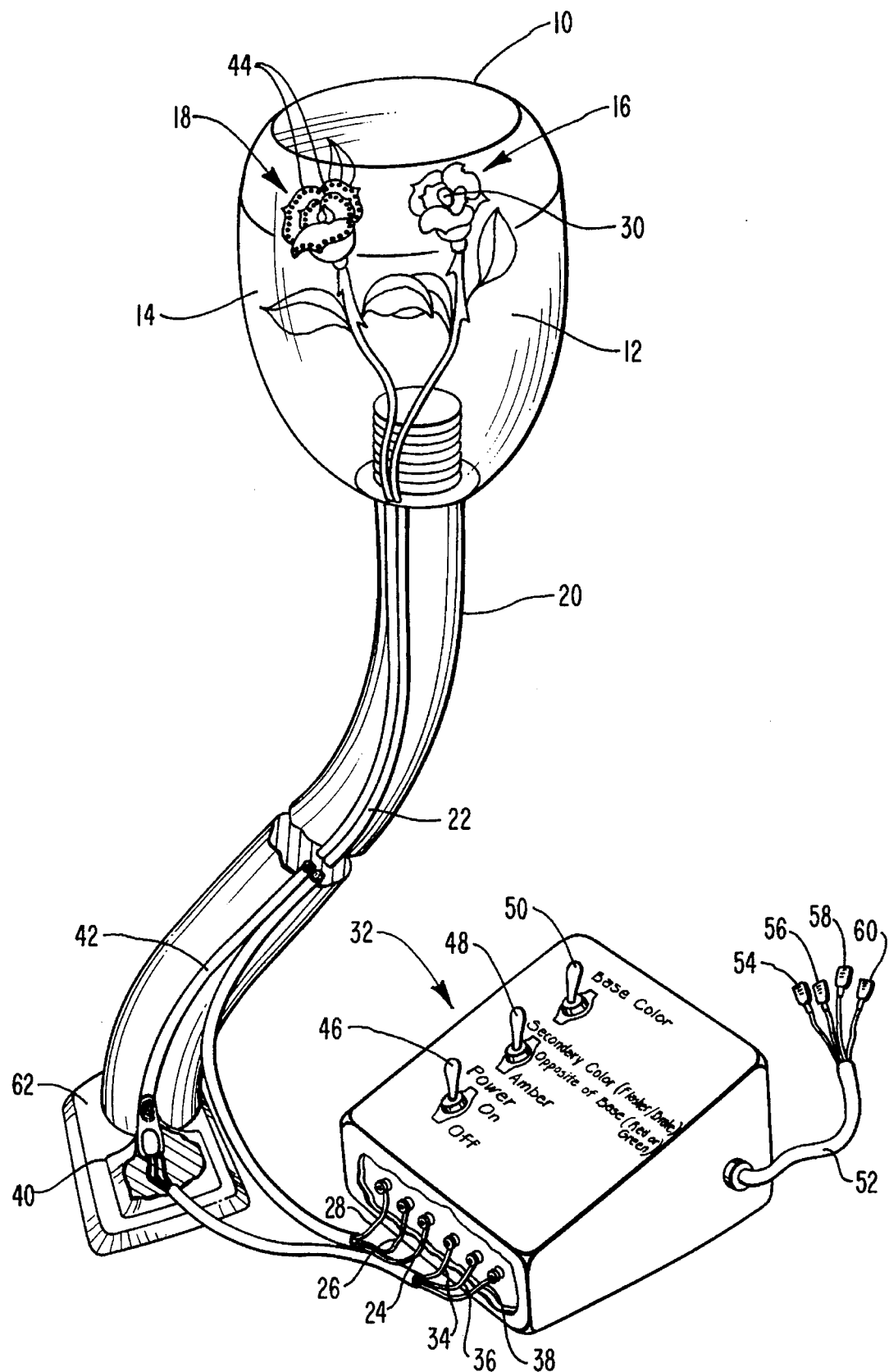
FIG. 2 is a perspective, partial cut away view of an embodiment of a secondary flasher/brake indicator in the form of a stick shift knob wherein one indication area is illuminated directly by a tri-colored LED and the other indication area is illuminated indirectly through fiber optics, wherein the circuitry of FIG. 1 is used to control the colors used in the LEDs.

FIG. 2 shows a decorative secondary flasher/brake indicator incorporated in the form of stick shift handle and utilizing the circuit described in detail in FIG. 1. An ornamental stick shift knob 10 has formed therein two left and right decorative roses 12 and 14 that are aesthetically pleasing to the eye. Within the respective decorative roses 12 and 14 are left and right indication areas 16 and 18 that will illuminate for indication of braking and flasher operation. The right indication area 16 will be directly illuminated by LED 30 while the left indication area 18 will be illuminated indirectly by LED 40 through a plurality of optical fiber ends 44. This particular embodiment illustrates the two different forms of lighting, indirect and direct, that can be utilized in conjunction with the present invention and it is anticipated that commercial implementations will use either direct or indirect lighting for both indication areas.

The ornamental stick shift knob 10 is mounted on top of the stick shift column 20 which in turn hooks to the stick shift base 62 for connection into the transmission. The circuitry described in FIG. 1 is located in control box 32, which has leads exiting therefrom for controlling left and right LEDs 30 and 40 respectively. Right LED green anode lead 24, right LED lead anode lead 26, and right LED common cathode lead 28 form into right three lead bundle 28 that electrically connects the control box 32 with LED 30. Left LED green anode lead 34, left LED red anode lead 36, and left LED common cathode lead 38 also are bundled and directly connected to left LED 40 found in the stick shift base 62. The light from left LED 40 is transmitted to the left indication area 18 by means of optical fiber bundle 42 that runs along the stick shift column 20 and ends in a plurality of optical fiber ends 44 for illumination. In this manner, the left indication area 18 is indirectly lit by the left LED 40.

Leading into the control box 32 and the circuitry inside as disclosed in FIG. 1 is an input pigtail 52 comprising power lead 54, ground lead 56, right flasher/brake lead 58 and left flasher/brake lead 60. The right flasher/brake lead 58 will correlate with Signal 1 on signal lead 190 and the left flasher/brake lead 60 will correlate with Signal 2 on signal lead 192 as illustrated in FIG. 1. The leads found in the input pigtail 52 are attached into the automotive electrical system so as to integrate the secondary flasher/brake indicator into the normal operations of the vehicle. The power lead 54 may be electrically attached directly to a power source in the automobile thereby continuously providing power to the circuit internal to control box 32 or it may be electrically attached through the ignition circuitry so as to provide power only when the vehicle has a key inserted therein. While this embodiment and all other embodiments are described with a single lead carrying both flasher and brake operation as one electronic signal, some vehicular implementations may require a separate lead to carry the electronic signal representing brake operation if the automotive circuitry does not combine the brake and flasher signal functionality into one lead.

To operate control box 32 there are three switches: power switch 46, secondary color switch 48, and base color switch 50. These switches are electrically connected to the circuitry inside the control box 32 and provide the means by which a user may select the colors for right and left LEDs 30 and 40 respectively. Power switch 46 allows power to the circuit from power lead 54. When this switch is in the "off" position, right and left LEDs 30 and 40 will not light under any circumstances. When in the "on" position, the colors selected by base color switch 50 and secondary color switch 48 are illuminated according to the state of electronic signals representing the operation of the flashers and/or brake.

Base color 50 switch allows the selection of the no-signal color by placing it in the "red" or "green" position to correspond to the desired color for the left and right LEDs 30 and 40 when no signal is present. The secondary color switch 48 allows for selection of the signal color by placing it in the "opposite" or "amber" position to correspond to the desired color when the signal representing flasher or brake operation is present. When in the "opposite" position the previously non-selected base color (red or green) will light whereas in the "amber" position the amber color will light. With the circuit powered on, the following Table 2 illustrates the positions of the switches along with operation of a flasher or brake to show how respective right and left LEDs 30 and 40 will light.

TABLE 2

| Flasher/Brake (On/Off) | Base (Red/Green) | Secondary (Opposite of Base/Amber) | LED Color |
| --- | --- | --- | --- |
| Off | Red | Opposite | Red |
| Off | Red | Amber | Red |
| Off | Green | Opposite | Green |
| Off | Green | Amber | Green |
| On | Red | Opposite | Green |
| On | Red | Amber | Amber |
| On | Green | Opposite | Red |
| On | Green | Amber | Amber |

Figure 3:
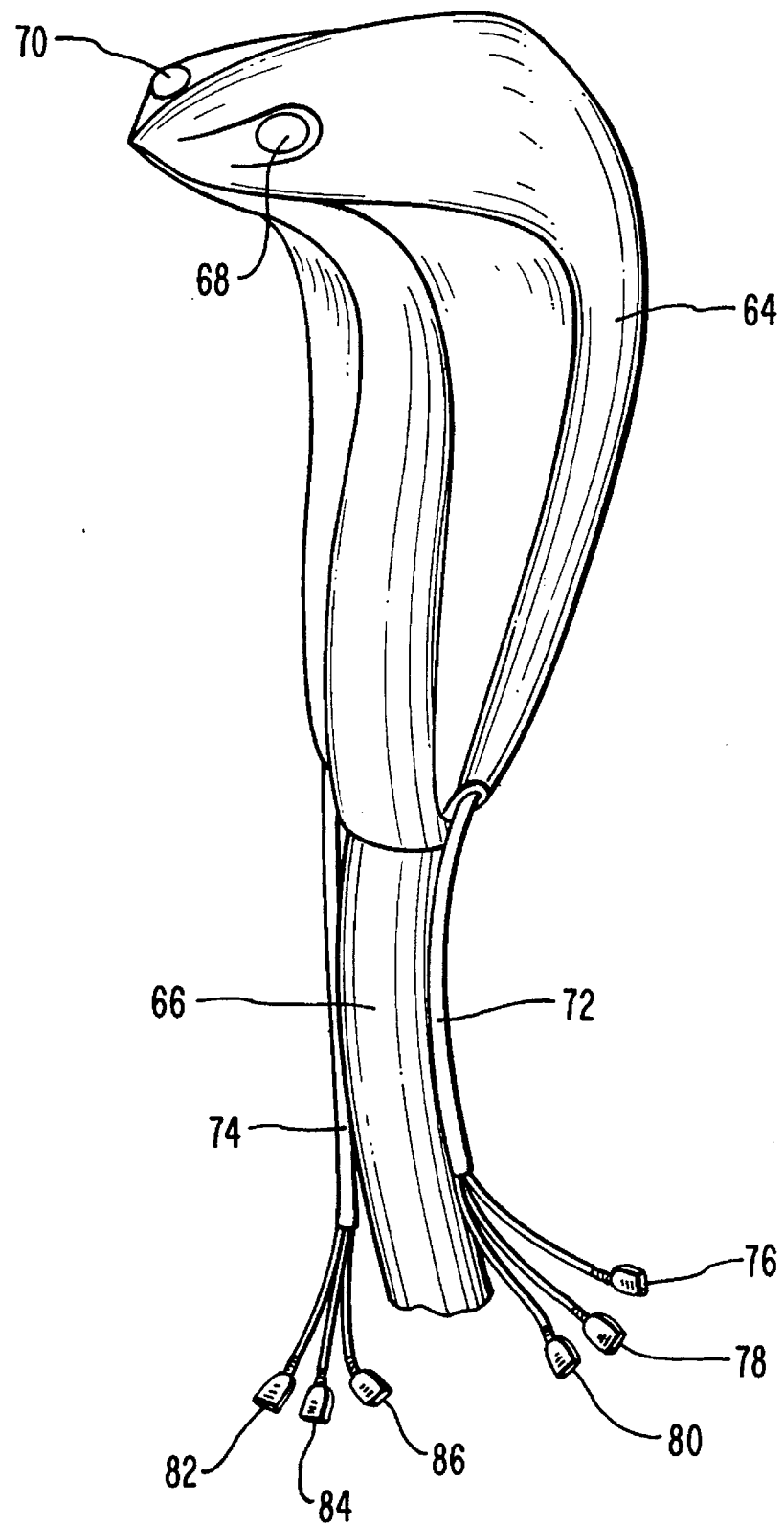
FIG. 3 is a perspective view of an alternative embodiment of a secondary flasher/brake indicator in the form of a stick shift knob wherein tri-colored LEDs are formed in the shape of an animal or human head.

FIG. 3 shows an alternative stick shift knob embodiment wherein the stick shift knob housing is shaped like the head of an animal or human in totality or in part. Referring to FIG. 3, the ornamental stick shift knob 64 is formed in the shape of a hooded cobra and forms a housing for right LED 68 and left LED 70 that are used as eyes for the cobra head. The cobra head ornamental stick shift knob 64 rests on top of the stick shift column 66 and has respective left and right three lead bundles 72 and 74 in order to control the respective right and left LEDs 68 and 70. The right three lead bundle consists of the right LED green anode lead 76, the right LED red anode lead 78, and the right LED common cathode lead 80, while the left three lead bundle 74 consists of the left LED green anode lead 82, the left LED red anode lead 84, and the left LED common cathode lead 86. The leads from the respective three lead bundles 72 and 74 are attached to a control box as was explained previously for allowing a user selectability in controlling the colors of the eyes represented by right and left LEDs 68 and 70.

Figure 4:
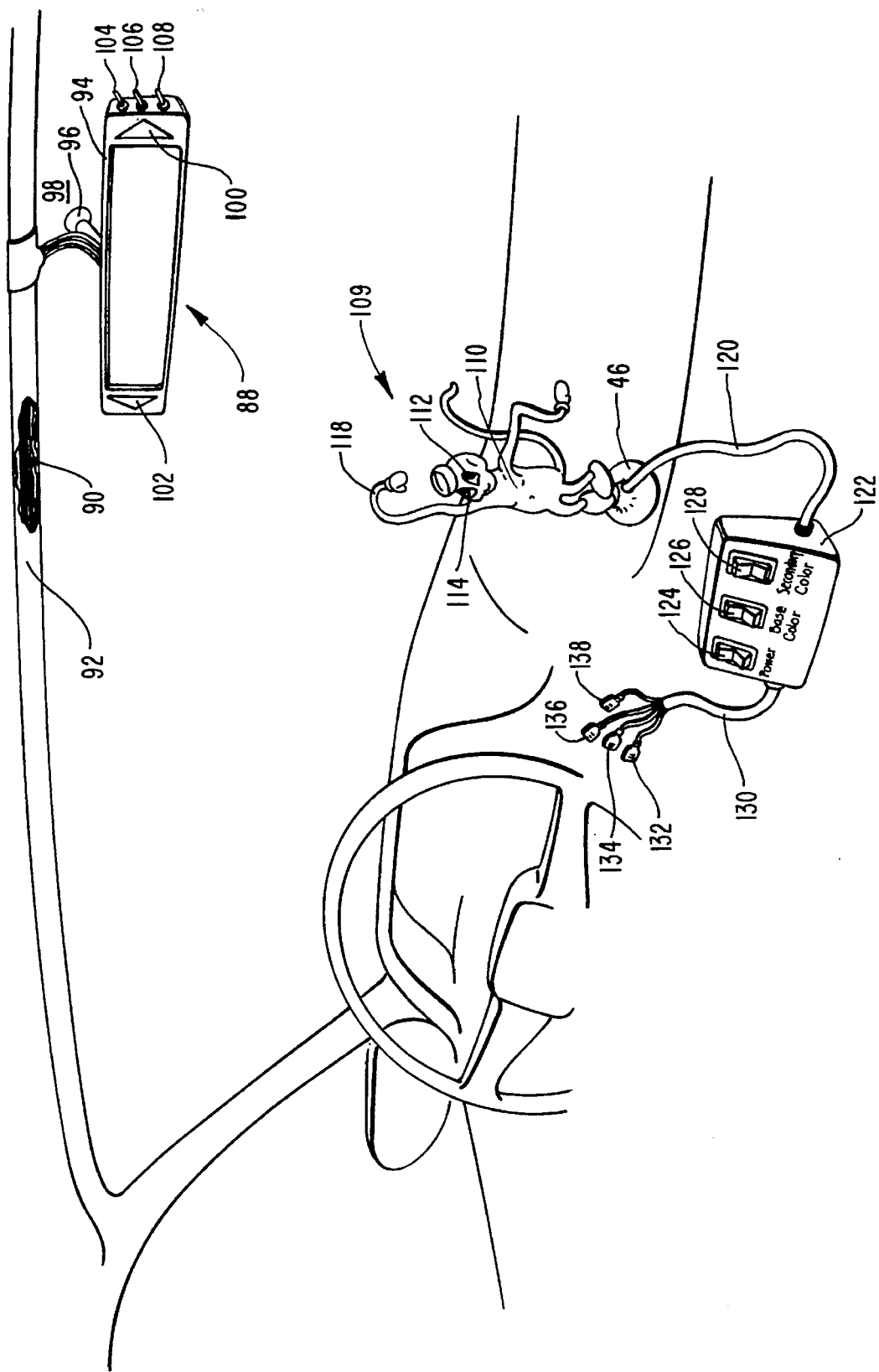
FIG. 4 is a perspective view of two alternative embodiments of a secondary flasher/brake indicator in the cockpit of an automobile. The first is a rearview mirror implementation that could be manufactured into the base automobile and the other is an aftermarket accessory implementation that can be attached with suction means to the dash or other smooth surface of an automobile.

Referring now to FIG. 4, two more embodiments of a secondary flasher/brake indicator are disclosed. The first is an integrated rearview mirror and secondary flasher/brake indicator 88 while the other is an aftermarket accessory 109 having incorporated therein a secondary flasher/brake indicator.

The integrated rearview mirror and secondary flasher/brake indicator 88 has a rearview housing 94 with right and left indication areas 100 and 102 respectively. The rearview mirror housing 94 is attached to windshield 98 by way of rearview mirror mounting means 96 and the input lead pigtail 94 goes from rearview mirror housing 94 into and behind the windshield interior molding 92 to be connected with the automotive electrical system. The right 2 left indication areas 100 and 102 are preferable clear so that the LEDs will transmit the desired color either directly or indirectly through some from of optical conduit.

The lighting circuitry and LEDs are enclosed within rearview mirror housing 94 and the control switches are attached thereto as well. Power switch 104, base color switch 106, and secondary color switch 108 are used to control the color of the internal right and left LEDs that will illuminate the respective right and left indication areas 100 and 102. These switches operate in the same manner as previously disclosed in connection with FIG. 2.

The integrated rearview mirror and secondary flasher/brake indicator 88 embodiment of the current invention provides advantages in that flasher and brake status are easily recognized as a vehicle operator glances into the rearview mirror. Furthermore, by integrating directly into the manufacture of the automobile, the embodiment will more seemlessly fit into the vehicular cockpit design.

Aftermarket accessory 109 is an embodiment that incorporates a secondary flasher/brake indicator into a decorative figurine having eyes that can be represented by tri-color LEDs. Decorative figurine housing 110 contains right and left LEDs 112 and 114 respectively. Again, the right and left LEDs 112 and 114 can be selectively controlled so that the desired colors are used for the base line operation when neither the flashers or brake are in operation.

The decorative figurine housing 110 has mounting means for securely attaching the figurine housing within the cockpit of a vehicle. Illustrated in FIG. 4 are two embodiments of the mounting means that could alternatively be used, first a hanger 118 that would allow the figurine housing to be hung from the rearview mirror as are many auto accessories, and suction cup 46 for affixing the figuring housing 110 to any relatively and substantially flat surface such as the dashboard or windshield. Alternatively, the mounting means could comprise of a loop of corridor string.

Controlling the lighting of the right and left LEDs 112 and 114, are the left and right LED lead bundle 120. Bundle 120 comprises the six leads required to control two LEDs as has been explained previously. Control box 122 receives the leads into the internal circuitry that operates as has been explained in reference to FIG. 1. Also going into control box 122 is the input lead pigtail 130 that comprises: power lead 132, ground lead 134, right flasher brake lead 136 and left flasher/brake lead 138. These leads are integrated into the automotive electrical system for providing power and signals to the control box 122 circuitry as has been explained previously in connection with the embodiment shown in FIG. 2.

Again, control box 122 has the three switches for controlling the power to the LEDs and selecting the colors associated with the flashers and brake action. These switches are power switch 124, base color switch 126, and secondary color switch 128. These switches are connected to the internal circuitry of the control box 122 and their operation for selecting colors has been explained previously in connection with the embodiment of FIG. 2.

Figure 5:
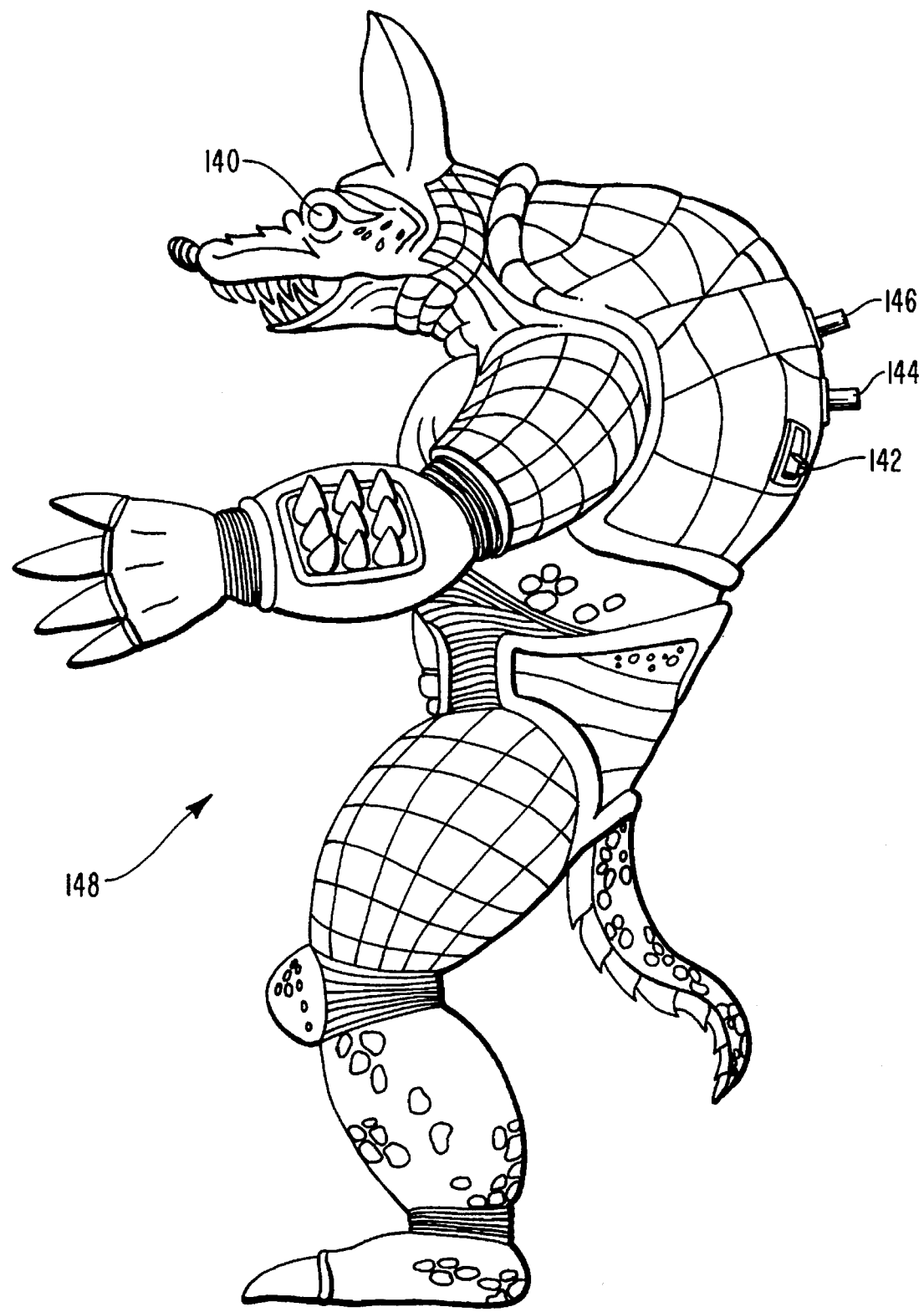
FIG. 5 shows a toy figurine (Armadillo Man) according to the present invention having tri-color LEDs for eyes and switches for selecting the color of the eyes in order to represent different states or characteristics of the toy for enhanced play.

Referring now to FIG. 5, a toy embodiment of the present invention is disclosed. An external housing 148 makes up the basic shape of the toy and houses the LEDs that will represent eyes. Shown here in perspective view is left LED 140 representing the left eye of the toy figure and the external housing is in the form of an aggressive and well armored armadillo hereinafter referred to as Armadillo Man. External housing 148 could be in the shape or form of any animal and can be made out of many different materials as is known and common in the art. External housing 148 provides a base for mounting multi-colored LEDs that make up the eyes of the figurine for placing the control switches in some embodiments, and a housing for the electronic circuitry that houses the LEDs. Some embodiments may use remote control means to house eye color control switches and commands by infrared, radio, or other means with circuitry constrained in the external housing 148.

Attached to external housing 148 is power switch 142, base color change switch 144, and secondary color change switch 146. Power switch 142 is a simple on/off toggle switch in order to power up the circuitry and hence the LEDs representing the eyes as illustrated by left LED 140. The base color change switch 144 and the secondary color change switch 146 are spring actuated switches that are set in a normal position, but will change upon depression of the switch. Other forms of switches could also be used where they are toggled from one state to the other and retain that state or where pushing and releasing the switch will change the switch state and thereby changing the respective color of the eyes. In this embodiment, depression of either switch 144 or 146 will cause a change of color to occur in the eyes and will maintain that changed color until the switch is released. Again other embodiments utilizing the same circuitry, but different kinds of switching could achieve different effects.

A child operating such a toy is able to utilize greater creativity during the course of play than when operating a similar toy without eyes that change color. For example, by assigning different states to the toy dependent upon the eye color, different qualities of the figurine may be readily ascertained. To illustrate this, imagine that the normal state of the disclosed Armadillo Man is represented by the eyes being green. However, should a button be depressed such that the eyes turn red, this could signify that Armadillo Man has achieved super strength and ability much like Popeye the Sailor Man upon eating a can of spinach.

Finally, should the buttons be depressed so that the eyes of Armadillo Man are amber, this could be used to represent a laser beam from armadillo man's eyes being directed to destroy objects and opponents in his path. As can be clearly seen, imagination is the only limit to the states that the differing colors could represent and the fertile imagination of children will undoubtedly make good use of the added feature of having user selectability in choosing the colors of the eyes of a toy figurine.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An automotive flasher/brake indicator accessory for secondary indication of the status of an automobile flasher operation and brake operation in an automobile having a braking means and associated signal, left flashing means and associated signal, and right flashing means and associated signal, the automotive flasher/brake indicator accessory comprising:

an ornamental housing having at least two indication areas;

at least two current driven tri-color LED indicators each capable of emitting a first, second, and third color and mounted within the housing for illuminating the respective indication areas, at least one of the tri-color LED indicator means corresponding to left flasher operation and brake operation and at least another tri-color LED indicator means corresponding to right flasher operation and brake operation;

means for receiving electronic signal information representing the automobile right flasher operation, left flasher operation, and brake operation;

tri-color LED driving circuitry, electrically connected to the respective tri-color LED indicators and electrically connected and responsive to the means for receiving the signal information, the tri-color LED driving circuitry causing respective tri-color LED indicators to emit a base color for normal operation and a secondary color for brake operation and/or respective flasher operation;

a base color switching means for selecting a base color from a first or second color; and secondary color switching means for selecting a secondary color from the previously non-selected first or second color and a third color.

2. An automotive flasher/brake indicator accessory as recited in claim 1, wherein the ornamental housing is in the form of a stick shift knob.

3. An automotive flasher/brake indicator accessory as recited in claim 1, wherein the ornamental housing is in the form of stick shift knob shaped like a head and the LEDs make up the eyes thereof.

4. An automotive flasher/brake indicator accessory as recited in claim 1 wherein one of the at least two LEDs directly illuminates at least one indication area.

5. An automotive flasher/brake indicator accessory as recited in claim 1 further comprising at least one illumination conduit to optically transfer light from at least one of the at least two LEDs to at least one indication area.

6. An automotive flasher/brake indicator accessory as recited in claim 1 further comprising at least one fiber optic means to optically transfer light from at least one of the at least two LEDs to at least one indication area.

7. An automotive flasher/brake indicator accessory as recited in claim 1 wherein the ornamental housing is in the form of a rearview mirror.

8. An automotive flasher/brake indicator accessory as recited in claim 1 wherein the ornamental housing is in the form of a decorative object, the decorative object having mounting means for secure placement within an automobile.

9. An automotive flasher/brake indicator accessory as recited in claim 8 wherein the mounting means comprises hanging means for hanging the decorative object.

10. An automotive flasher/brake indicator accessory as recited in claim 8 wherein the mounting means comprises suction means for affixing the decorative object to a relatively smooth surface found within an automobile.

11. A configurable biasing circuit for biasing at least one tri-color LED capable of producing a first, second and third color, in applications having at least one signal requiring a visual output and corresponding to the respective at least one tri-colored LED, the biasing circuit comprising:

means for providing power to the at least one tri-color LED;

means for selecting a base color from the first or second color, the base color establishing a visual output when the signal is not present; and means for selecting a secondary color from the previously non-selected first or second color and the third color, the secondary color for establishing a visual output when the at least one signal is present.

12. A biasing circuit as recited in claim 11 wherein the signal is the electronic representation of the operation of an automobile brake or flasher.

13. A biasing circuit as recited in claim 11 wherein the signal is electronic signals caused by switches within a toy figurine.

14. An automotive flasher/brake indicator accessory for use with a right flasher/brake electronic signal and a left flasher/brake electronic signal, the automotive flasher/brake indicator accessory comprising:

a stickshift knob having a right and a left indication areas;

a left and right tri-color LED for illuminating the respective right and left indication area and optically connected thereto; and a left and right tri-color LED biasing circuit as defined in claim 11 electrically connected to the right flasher/brake signal and the left flasher/brake signal.

* * * * *